(12) United States Patent
Ruzich et al.

(10) Patent No.: US 11,046,227 B2
(45) Date of Patent: Jun. 29, 2021

(54) ASSIST GRIP ASSEMBLY INCLUDING A PIVOTAL OBJECT HOOK

(71) Applicant: ILLINOIS TOOL WORKS INC., Glenview, IL (US)

(72) Inventors: Justin L. Ruzich, Frankfort, IL (US); Walter Belchine, III, Plainfield, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/489,802

(22) PCT Filed: Feb. 19, 2018

(86) PCT No.: PCT/US2018/018610
§ 371 (c)(1),
(2) Date: Aug. 29, 2019

(87) PCT Pub. No.: WO2018/164826
PCT Pub. Date: Sep. 13, 2018

(65) Prior Publication Data
US 2020/0039410 A1 Feb. 6, 2020

Related U.S. Application Data

(60) Provisional application No. 62/469,031, filed on Mar. 9, 2017.

(51) Int. Cl.
*B62B 7/00* (2006.01)
*B60N 3/02* (2006.01)
*B60R 7/08* (2006.01)

(52) U.S. Cl.
CPC ............. *B60N 3/026* (2013.01); *B60N 3/023* (2013.01); *B60R 7/08* (2013.01)

(58) Field of Classification Search
CPC ... Y10T 16/513; Y10T 16/516; Y10T 16/466; Y10T 16/473; B60N 3/026; B60N 3/02; B60N 3/023; B60Y 2200/11; B60R 7/08
See application file for complete search history.

(56) References Cited

U.S. PATENT DOCUMENTS

| | | | |
|---|---|---|---|
| 4,720,028 A | * | 1/1988 | Takemura ................. B60R 7/10 224/313 |
| 4,734,955 A | | 4/1988 | Connor |
| 4,953,259 A | | 9/1990 | Frye et al. |

(Continued)

FOREIGN PATENT DOCUMENTS

| | | | |
|---|---|---|---|
| JP | 2008162339 A | * | 7/2008 |
| JP | 3180107 U | * | 12/2012 |
| KR | 100802834 B1 | * | 2/2008 |

OTHER PUBLICATIONS

International Search Report for PCT/US2018/018610, dated May 14, 2018.

*Primary Examiner* — Chuck Y Mah
(74) *Attorney, Agent, or Firm* — Quarles & Brady LLP (57) ABSTRACT

Assist grip assembly (100) includes a user handle (102) and an object hook (104) movably coupled to each other. The object hook (104) and the user handle (102) may be movably coupled to one another through a pivot-control mechanism. The user handle (102) and the object hook (104) are capable of moving together and capable of moving independently with respect to one another.

20 Claims, 4 Drawing Sheets

(56) References Cited

U.S. PATENT DOCUMENTS

| | | | | |
|---|---|---|---|---|
| 5,855,408 | A * | 1/1999 | Rickabus | B60N 3/023 |
| | | | | 105/354 |
| 6,076,233 | A * | 6/2000 | Sasaki | B60N 3/026 |
| | | | | 16/438 |
| 6,397,435 | B1 * | 6/2002 | Gosselet | B60N 3/023 |
| | | | | 16/438 |
| 6,643,897 | B2 | 11/2003 | Chang | |
| 7,103,939 | B2 | 9/2006 | Belchine, III et al. | |
| 7,988,115 | B2 * | 8/2011 | Lee | F16B 45/00 |
| | | | | 248/304 |
| 8,677,569 | B2 | 3/2014 | Ruzich et al. | |
| 10,668,847 | B2 * | 6/2020 | Takenaka | B60N 3/026 |
| 2005/0028323 | A1 * | 2/2005 | Meyer | B60N 3/023 |
| | | | | 16/445 |

* cited by examiner

ASSIST GRIP ASSEMBLY INCLUDING A PIVOTAL OBJECT HOOK

RELATED APPLICATIONS

This application represents the United States National Stage of International Application No. PCT/US2018/018610, filed Feb. 19, 2018, which claims priority to U.S. Provisional Patent Application No. 62/469,031, entitled "Assist Grip Assembly," filed Mar. 9, 2017, which are hereby incorporated by reference in their entirety.

FIELD OF EMBODIMENTS OF THE DISCLOSURE

Embodiments of the present disclosure generally relate to assist grip assemblies, such as used within vehicles.

BACKGROUND

Assist grip assemblies are used in vehicles, such as to assist individuals into and out of driver and/or passenger seats. For example, an assist grip assembly may be secured to a frame around a window of a vehicle proximate to a passenger seat. The assist grip assembly has a user handle that is configured to rotate to an open position. A passenger within a seat may grasp the user handle and rotate the user handle down to the open position. The passenger may utilize the user handle to assist him/herself into and out of the seat.

An assist grip assembly is secured to the frame through one or more securing assemblies, which may include fasteners. Assist grip assemblies may include an articulating hook. The hook provides a convenient location to hang items, such as coats, clothing on hangers, or bags with hand grips. The hook may be movable between different positions. Often assist grip assemblies with articulating hooks present complex mechanisms requiring numerous additional components, such as extra springs, "C" clamps, special styling cap, and secondary pins. Also, the complexities of these prior devices have dictated separate molds for grab handles accommodating the hook feature. For at least one known assist grip assembly, the hook is permitted to rotate 180° without a hard stop. Excessive rotation may lead to misalignments in the vehicle.

U.S. Pat. No. 7,103,939 discloses a pin-less damper assembly for an assist user handle. U.S. Pat. No. 8,677,569 discloses an articulating clutch hook system.

SUMMARY OF EMBODIMENTS OF THE DISCLOSURE

In at least one embodiment, an assist grip assembly is provided that includes a user handle and an object hook movably coupled to each other. The object hook and the user handle may be movably coupled to one another through a pivot-control mechanism. The user handle and the object hook are capable of moving together and capable of moving independently with respect to one another.

In at least one embodiment, an assist grip assembly is provided that includes a user handle and an object hook pivotally coupled to the user handle. The assist grip assembly also includes a pivot-control mechanism enabling dependent rotation, in which the object hook and the user handle move together, and permitting independent rotation, in which the object hook and the user handle move freely with respect to one another. The pivot-control mechanism includes a mating shaft and a receiving cavity having a flex retainer disposed therein. The flex retainer engages the mating shaft during the dependent rotation. The flex retainer releases the mating shaft to permit the independent rotation.

In at least one embodiment, an assist grip assembly is provided that includes a user handle and an object hook. The assist grip assembly also includes a pivot-control mechanism that pivotally couples the user handle and the object hook. The pivot-control mechanism including a mating shaft configured to rotate about a shaft axis. The mating shaft includes a first pivot-stop surface and a second pivot-stop surface. The pivot-control mechanism also includes a receiving cavity configured to receive the mating shaft. The receiving cavity is partially defined by a first wall surface and a second wall surface. The object hook is configured to rotate between a first pivot position and a second pivot position. The first wall surface engages the first pivot-stop surface in the first pivot position. The second wall surface engages the second pivot-stop surface in the second pivot position. The pivot-control mechanism also includes a pivot bump and a recess surface that engage each other in the receiving cavity. The recess surface holds the pivot bump when an applied rotational force is less than a designated threshold. The pivot bump and the recess surface clear each other when the applied rotational force exceeds the designated threshold. The object hook is permitted to rotate independently with respect to the user handle after the pivot bump and the recess surface clear each other.

In at least one embodiment, an assist grip assembly is provided that includes a user handle having a grip section and a handle leg extending from the grip section. The user handle also includes a mating shaft. The mating shaft includes a first pivot-stop surface and a second pivot-stop surface and has a pivot boss at a distal end of the mating shaft. The mating shaft is integrally formed with the handle leg. The assist grip assembly also includes an object hook having a receiving cavity. The receiving cavity is partially defined by a first wall surface and a second wall surface. The receiving cavity is also partially defined by a boss-engaging surface that is sized and shaped to form a snap-fit with the pivot boss of the mating shaft when the mating shaft is inserted into the receiving cavity. The mating shaft and the receiving cavity form a pivot-control mechanism that permits the mating shaft to rotate between a first pivot position and a second pivot position. The first wall surface engages the first pivot-stop surface in the first pivot position, and the second wall surface engages the second pivot-stop surface in the second pivot position.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide an assist grip assembly having a user handle configured to be gripped by an individual and an object hook that is configured to hold an object, such as a coat or bag. The user handle and the object hook are capable of rotating or pivoting together, as a unit, and are also capable of rotating or pivoting independent of each other. The user handle and the object hook may be pivotally coupled to one another by a pivot-control mechanism in which the pivot-control mechanism includes a mating shaft and surfaces that define a receiving cavity.

Embodiments of the present disclosure may eliminate, minimize, or otherwise reduce the need for certain components while connecting the object hook to a user handle of the assist grip assembly. Embodiments may also simplify assembly of the various components and/or reduce the duration of time used to assemble the assist grip assembly. For example, the mating shaft and the receiving cavity may snapably secure to one another, thereby eliminating an additional part, to functionally interlock the object hook to the user handle. In some embodiments, a single motion of inserting the mating shaft into the receiving cavity may snapably secure the object hook and the user handle.

In some embodiments, the pivot-control mechanism operates such that, when the user handle is pulled down, a spring-like plastic retainer flexes and allows the object hook to rotate relative to the user handle. The user handle may remain in a stationary position with respect to the environment. In at least one embodiment, surfaces of the mating shaft and the receiving cavity provide positive stops that prevent over-traveling, which may otherwise result in misalignment.

For at least one embodiment, the assist grip assembly may require fewer parts than known assist grip assemblies, thereby simplifying the process of assembling; may reduce assembly times and inventory of components; may require fewer discreet elements that are difficult to integrate with the assist grip assembly; may prevent excessive rotation of the object hook; and/or may avoid misalignments when operating the object hook; and may provide a more intuitive and ergonomic operation. Embodiments may provide each and every one of the above listed features or provide fewer features.

Figure 7:
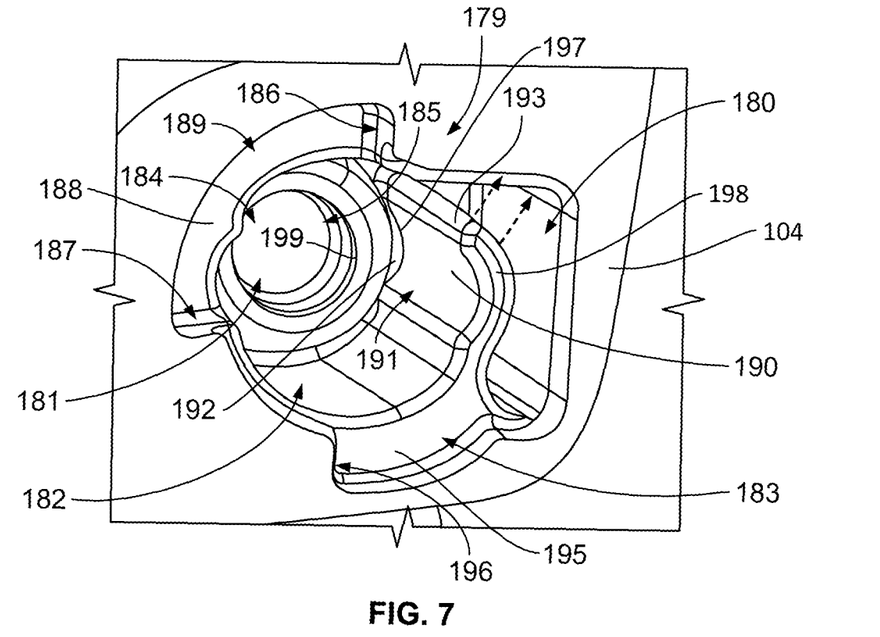
FIG. 7 is a perspective view of a receiving cavity that may be used to pivotally couple the user handle and the object hook.

In the following description, the object hook includes the receiving cavity, and the user handle includes the mating shaft. It should be understood that, in other embodiments, the object hook includes the mating shaft, and the user handle includes the receiving cavity. Moreover, it should be understood that the different surfaces that form the pivot-control mechanism may have different positions than those shown in the figures and/or be part of the opposing element. For example, in an alternative embodiment, the receiving cavity may include a pivot boss, such as the pivot boss 148 (FIG. 5) and the mating shaft may include a space having an opening that receives the pivot boss, such as the boss-receiving region 181 (FIG. 7). Accordingly, unless explicitly stated otherwise (e.g., "the object hook [including or having] the receiving cavity," it should be understood that the object hook may have the receiving cavity or the mating shaft or different features of each and that the user handle may have the mating shaft or the receiving cavity or different features of each.

Figure 1:
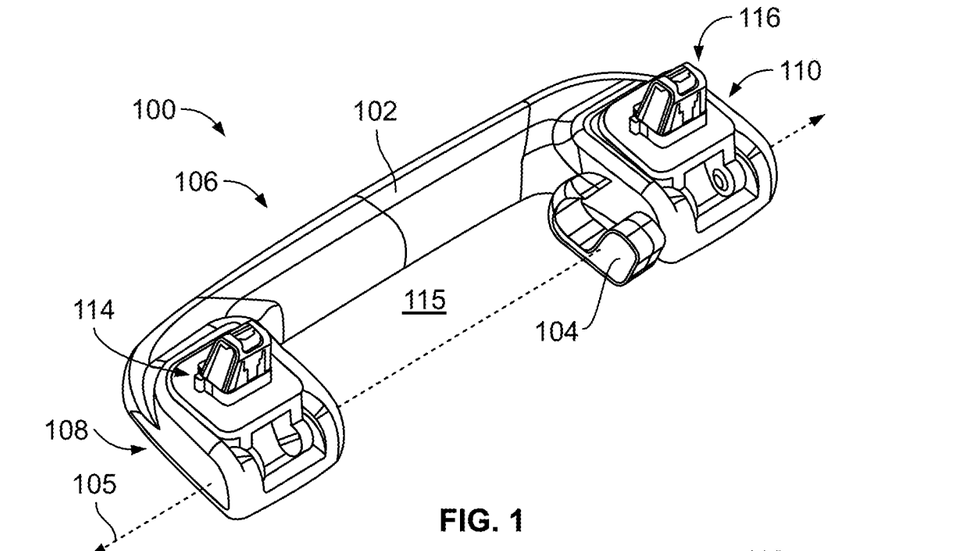
FIG. 1 is a perspective view of an assist grip assembly having a user handle and an object hook in accordance with an embodiment, wherein the user handle is in a closed position and the object hook is in a closed position.
Figure 2:
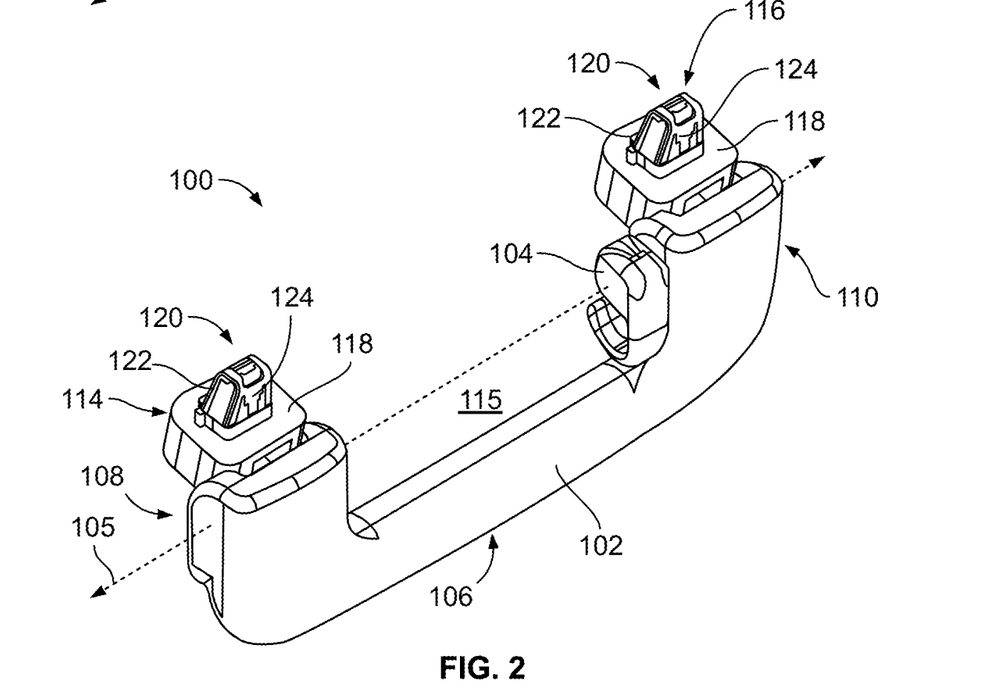
FIG. 2 is a perspective view of the assist grip assembly of FIG. 1 in which the user handle is in an open position and the object hook is in the closed position.
Figure 3:
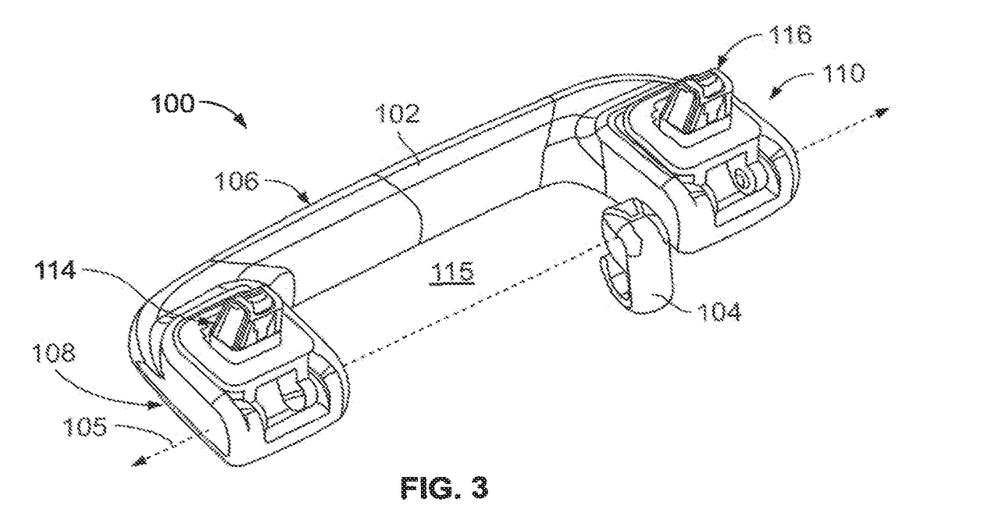
FIG. 3 is a perspective view of the assist grip assembly of FIG. 1 in which the user handle is in the closed position and the object hook is in the open position.

FIGS. 1, 2, and 3 show perspective views of an assist grip assembly 100 that includes a user handle 102 and an object hook 104. The user handle 102 and the object hook 104 are rotatably coupled to one another. In the illustrated embodiment, each of the user handle 102 and the object hook 104 is rotatable with respect to a common axis (or the same axis) 105. In FIG. 1, the user handle 102 is in a closed or home position and the object hook 104 is in a closed or inaccessible position. In the closed position, the user handle 102 is less accessible than in the open position. For example, the user handle 102 may be positioned against a surface (e.g., ceiling) and more difficult to grip when in the closed position. In FIG. 2, the user handle 102 is in an open position (e.g., positioned away from the ceiling) such that a user is better able to grip the user handle 102. The object hook 104 is in the closed position. In FIG. 3, the user handle 102 is in the closed position and the object hook 104 is in an open or working position. As such, the object hook 104 is capable of moving relative to the user handle 102 when the user handle 102 is in the closed position. Although not shown, the object hook 104 may also be capable of moving relative to the user handle 102 when the user handle 102 is in an open position.

Although FIGS. 1-3 illustrate the user handle 102 and the object hook 104 being rotatable about the same axis 105, it is contemplated that the user handle 102 and the object hook 104 may rotate with respect to different axes that are offset from one another.

The user handle 102 includes a grip section 106 and first and second handle legs 108, 110 that are coupled to opposite ends of the grip section 106. The first and second handle legs 108, 110 extend in a direction that is generally transverse with respect to the grip section. The first and second handle legs 108, 110 form an offset with respect to a support surface (not shown) to which the assist grip assembly 100 is attached. More specifically, the first and second handle legs 108, 110 form a digit-insertion space 115 is defined by the grip section 106, the first and second handle legs 108, 110, and the support surface (not shown) to which the assist grip assembly 100 is attached. The support surface may be, for example, a wall or ceiling in a motor vehicle.

The grip section 106 is sized and shaped to be gripped a handle of an individual. For example, the grip section 106 has a length that may receive fingers from an individual and a diameter that allows the fingers to curve at least partially around the grip section 106.

The assist grip assembly 100 may also include first and second coupling hinges 114, 116 that secure the first and second handle legs 108, 110, respectively, to the support surface (not shown). As shown in FIG. 2, each of the first and second coupling hinges 114, 116 includes a hinge base 118 and an attachment member 120. In the illustrated embodiment, the attachment member 120 is a frame 122 that is secured in a fixed position with respect to the hinge base 118. The frame 122 includes one or more spring clips 124 that are configured to be engage another element (not shown) that is secured to the support surface. In other embodiments, however, the attachment member 120 may include one more tabs, latches, or other fastener elements.

Figure 4:
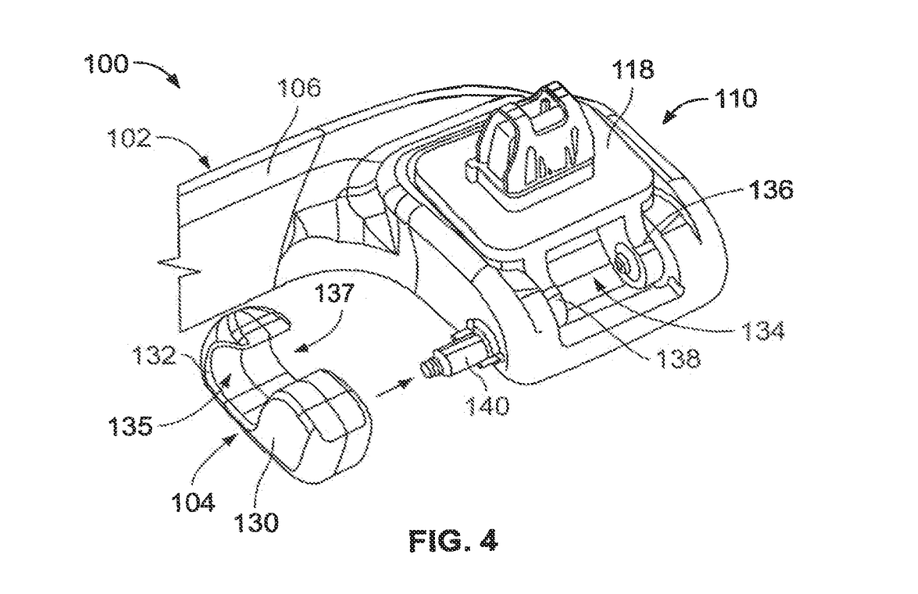
FIG. 4 is a perspective view of the assist grip assembly of FIG. 1 prior to the object hook being pivotally coupled to the user handle.

FIG. 4 is a perspective view of the assist grip assembly 100 in which the object hook 104 is poised for engaging a mating shaft 140 of the user handle 102. As shown, the hinge base 118 is positioned within a hinge cavity 134 and includes hinge extensions 136, 138. The hinge extensions 136, 138 are rotatably coupled to the second handle leg 110 within the hinge cavity 134. Although FIG. 4 only shows the hinge base 118 coupled to the second handle leg 110, the first handle leg 108 (FIG. 1) may be coupled to the corresponding hinge base 118 in a similar or identical manner.

The object hook 104 includes a hook base 130 and a finger 132 that is coupled to and extends away from the hook base 130. The finger 132 is shaped to define an element-receiving space 135 that is accessed through a side opening 137 of the finger 132. The finger 132 is designed such that a longitudinal element of an object (not shown), such as coat hanger or bag handle, may be positioned within the element-receiving space 135. When properly oriented with respect to gravity, the finger 132 grips the longitudinal element, thereby holding the object.

In the illustrated embodiment, the mating shaft 140 is a shaped feature that is integrated with other features of the user handle 102. The mating shaft may be integrally formed with the user handle 102. For example, the user handle 102 may include a single piece that is shaped to form the mating shaft 140 and other features of the user handle 102. For instance, at least one of the first and second handle legs 108, 110, the grip section 106, and the mating shaft 140 may be a single piece formed from a common material (the same material). Yet in other embodiments, the user handle 102 may include discrete elements that are secured to one another. The mating shaft 140 may be one of the discrete elements.

Figure 5:
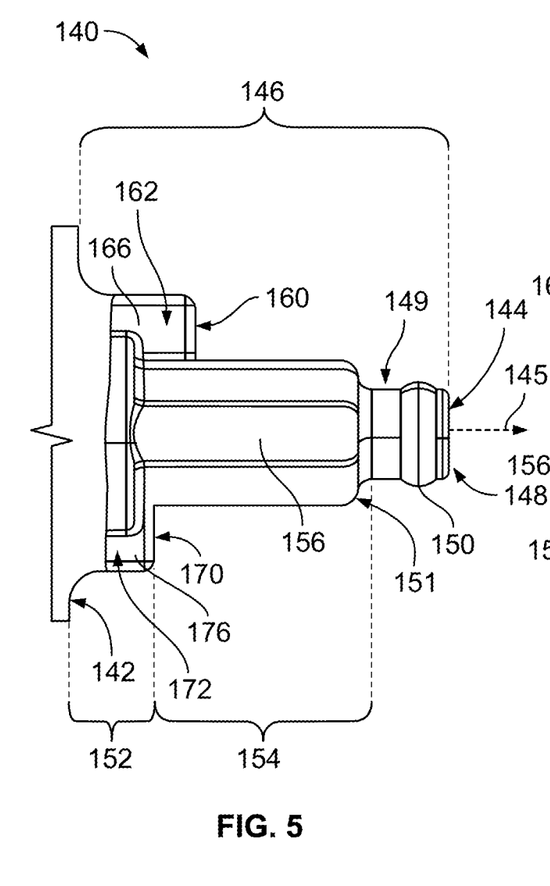
FIG. 5 is a side view of a mating shaft that may be used to pivotally couple the user handle and the object hook.
Figure 6:
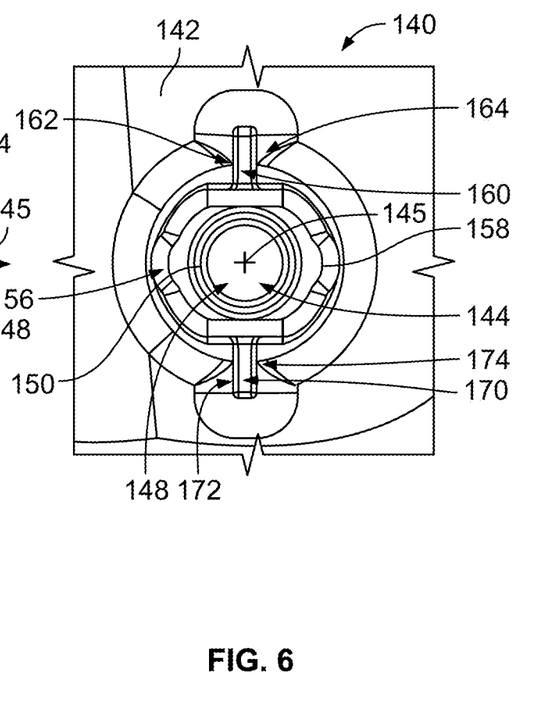
FIG. 6 is an end view of the mating shaft that may be used to pivotally couple the user handle and the object hook.

FIG. 5 is a side view of the mating shaft 140, and FIG. 6 is an end view of the mating shaft 140. The mating shaft 140 is sized and shaped to be inserted into a receiving cavity 180 (FIG. 7) of the object hook 104 (FIG. 1). More specifically, surfaces that define the shape or contour of the mating shaft 140 are configured relative to surfaces that define the receiving cavity 180 so that the object hook 104 may function as set forth herein.

As shown in FIGS. 5 and 6, the mating shaft 140 projects from a base surface 142. The mating shaft 140 is configured to rotate about a shaft axis 145, which may or may not coincide with the common axis 105 (FIG. 1). The mating shaft 140 has a distal end 144 that is located a height 146 (FIG. 5) relative to the base surface 142. The mating shaft 140 includes a pivotal boss 148 that includes the distal end 144 of the mating shaft 140. The pivotal boss 148 is shaped to include a circumferential protuberance 150.

With respect to FIG. 5, the mating shaft 140 includes a platform section 152 and a main section 154. The pivotal boss 148 extends from the main section 154 along the shaft axis 145. The platform section 152 and the main section 154 account for a majority of the height 146. For example, a combined length of the platform section 152 and the main section 154 may be at least three times (3×) a length of the pivotal boss 148. The lengths are measured along the shaft axis 145. The main section 154 has a greater length than a length of the platform section 152. Also shown in FIG. 5, an edge gap 149 is formed between the protuberance 150 and a top surface 151 of the main section 154.

As shown in FIGS. 5 and 6, the main section 154 includes a pivot bump 156 and a pivot bump 158. The pivot bumps 156, 158 may extend longitudinally along the main section 154 in a direction that is parallel to the shaft axis 145. The pivot bumps 156, 158 are elongated and extend longitudinally parallel to the shaft axis 145. At least one of the pivot bumps 156, 158 may be designed to impede, but not prevent, rotation of the mating shaft 140 about the shaft axis 145. For example, each of the pivot bumps 156, 158 represents a noticeable or abrupt change in the curved contour of the main section 154. More specifically, the pivot bumps 156, 158 extend further away from the shaft axis 145 than the surrounding area.

The pivot bumps 156, 158 may have different lengths. For example, the length of the pivot bump 158 may be shorter than the length of the pivot bump 156. The pivot bump 156 may extend entirely through the main section 154 and end at the pivotal boss 148.

The mating shaft 140 may also include an axial stop surface 160, a pivot-stop surface 162, and a pivot-stop surface 164. The axial stop surface 160 faces in a direction along the shaft axis 145 away from the base surface 142. The pivot-stop surface 162 and the pivot-stop surface 164 face in respective lateral directions. Optionally, the axial stop surface 160, the pivot-stop surface 162, and the pivot-stop surface 164 are surfaces of a wall section 166. For instance, the pivot-stop surface 162 and the pivot-stop surface 164 may be opposite side surfaces of the wall section 166 and face in opposite directions. The axial stop surface 160 may be a top surface or edge of the wall section 166. Although FIGS. 5 and 6 show the wall section 166 including the axial stop surface 160, the pivot-stop surface 162, and the pivot-stop surface 164, it is contemplated that the axial stop surface 160, the pivot-stop surface 162, and/or the pivot-stop surface 164 may be located on different features.

Similarly, the mating shaft 140 may include an axial stop surface 170, a pivot-stop surface 172, and a pivot-stop surface 174. The axial stop surface 170 faces in a direction along the shaft axis 145 away the base surface 142. The pivot-stop surface 172 and the pivot-stop surface 174 face in respective lateral directions. Optionally, the axial stop surface 170, the pivot-stop surface 172, and the pivot-stop surface 174 are surfaces of a wall section 176. For instance, the pivot-stop surface 172 and the pivot-stop surface 174 may be opposite side surfaces of the wall section 176 and face in opposite directions. The axial stop surface 170 may be a top surface or edge of the wall section 176. Although FIGS. 5 and 6 show the wall section 176 including the axial stop surface 170, the pivot-stop surface 172, and the pivot-stop surface 174, it is contemplated that the axial stop surface 170, the pivot-stop surface 172, and/or the pivot-stop surface 174 may be located on different features.

Figure 8:
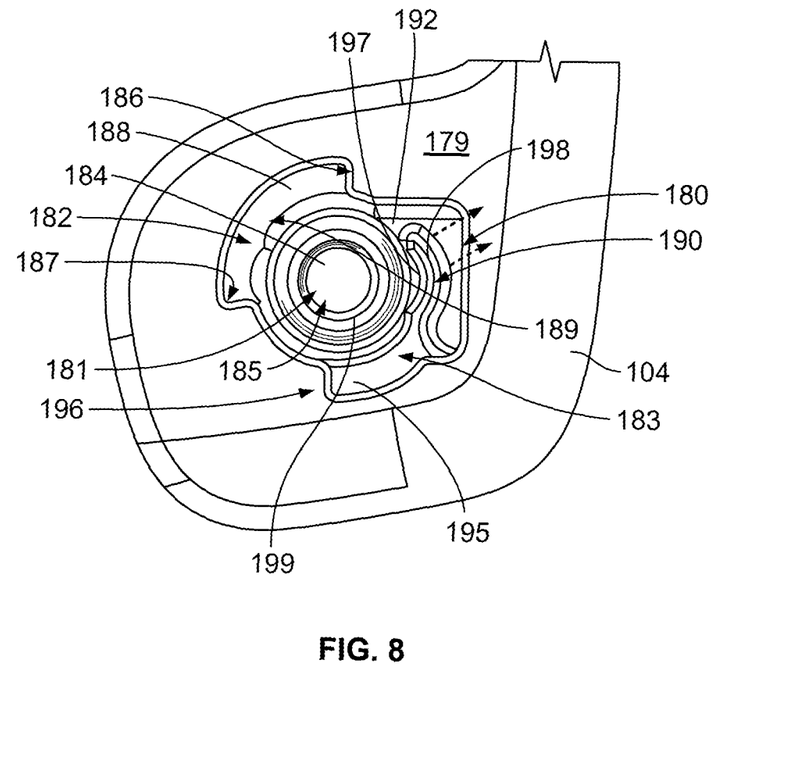
FIG. 8 is a plan view of the receiving cavity that may be used to pivotally couple the user handle and the object hook.

FIG. 7 is a perspective view of the receiving cavity 180, and FIG. 8 is a plan view of the receiving cavity 180. The receiving cavity 180 extends a depth into the object hook 104 from an exterior surface 179 of the object hook 104. The exterior surface 179 may be configured to slide alongside a corresponding surface of the user handle 102 (FIG. 1), such as a surface of the second handle leg 110 (FIG. 2). The receiving cavity 180 is configured to receive the mating shaft 140 (FIG. 4). The receiving cavity 180 is defined by different surfaces that interface with corresponding surfaces of the mating shaft 140.

The receiving cavity 180 includes different sub-regions or spaces. For example, the receiving cavity 180 includes a boss-receiving region 181, an operating region 182, and an outer region 183. The boss-receiving region 181 is defined by a boss-engaging surface 184. More specifically, the boss-engaging surface 184 is shaped to include an opening 185 to the boss-receiving region 181. The opening 185 is sized relative to the pivotal boss 148 (FIG. 5) so that the pivotal boss 148 may form a snap or interference fit with the boss-engaging surface 184.

The operating region 182 may be configured to receive the main section 154 (FIG. 5). Surfaces that define the receiving cavity 180 may cooperate with surfaces of the mating shaft 140 in securing the mating shaft 140 to the object hook 104. For example, the mating shaft 140 may be poised for insertion into the receiving cavity 180 by aligning the shaft axis 145 (FIG. 5) with the boss-receiving region 181. During insertion, the pivotal boss 148 (FIG. 5) engages an edge 199 that defines the opening 185. The pivotal boss 148 may snap into position after an applied axial force in a direction along the shaft axis 145 exceeds a threshold amount. The axial stop surface 160 (FIG. 5) engages a blocking surface 188, and the axial stop surface 170 (FIG. 5) engages a blocking surface 195. The blocking surfaces 188, 195 provide a positive stop that indicate the mating shaft 140 is fully mated with the receiving cavity 180.

Surfaces that define the operating region 182 cooperate with surfaces of the mating shaft 140 in controlling movement of the mating shaft 140. These surfaces collectively form a pivot-control mechanism of the assist grip assembly 100 (FIG. 1). For example, the receiving cavity 180 is partially defined by a first wall surface 186 and a second wall surface 187. The first wall surface 186 faces in a lateral direction and is configured to engage the first pivot-stop surface 162 (FIG. 5). The second wall surface 187 faces in a lateral direction and is configured to engage the second pivot-stop surface 164 (FIG. 6). In the illustrated embodiment, an arcuate space 189 extends between the first and second wall surfaces 186, 187 through which the wall section 166 (FIG. 5) is configured to move. In other embodiments, however, the first and second wall surfaces 186, 187 and the blocking surface 188 may have different positions within the receiving cavity 180.

Also shown in FIGS. 7 and 8, a flex retainer 190 is positioned within the receiving cavity 180. In the illustrated embodiment, the flex retainer 190 is a contoured wall having a height that is measured along the shaft axis 145 (FIG. 5). The flex retainer 190 may be movable with respect to surfaces that define the receiving cavity, such as the first wall surface 186, the second wall surface 187, the blocking surfaces 188, 195, or an edge that defines the opening 185. As indicated by the dashed arrows in FIGS. 7 and 8, the flex retainer 190 may be deflected in a radial direction away from the mating shaft 140.

The flex retainer 190 has a recess surface 191. The recess surface 191 is sized and shape to have the pivot bump 156 (FIG. 5) disposed therein. For example, the pivot bump 156 may be nested within a recess defined by the recess surface 191 such that a shape of the recess surface 191 complements a shape of the pivot bump 156. Optionally, the recess surface 191 is elongated and extends longitudinally parallel to the shaft axis 145. The flex retainer 190 has a longitudinal edge 193 that extends parallel to the shaft axis 145. The longitudinal edge 193 may represent the surface of the flex retainer 190 that lasts engages the pivot bump 156 when the pivot bump 156 clears the flex retainer 190 and moves toward the second pivot position. The longitudinal edge 193 may also represent the surface of the flex retainer 190 that first engages the pivot bump 156 when the pivot bump 156 returns to the first pivot position.

The flex retainer 190 also includes a base edge 197 and a distal or top wall edge 198. The longitudinal edge 193 extends between the base edge 197 and the distal wall edge 198. In the illustrated embodiment, each of the base edge 197 and the distal wall edge 198 extend or curve partially around the shaft axis 145. Optionally, the base edge 197 may be coupled to an interior base surface 192 of the receiving cavity 180 such that the flex retainer 190 projects from the interior base surface 192. Alternatively, at least a portion of the base edge 197 may be spaced apart from the interior base surface 192 such that a gap exists between the base edge 197 and the interior base surface 192. In such embodiments, the flex retainer 190 may more freely move or flex.

Although the flex retainer 190 may be somewhat rigid, the flex retainer 190 may allow some bending and/or deflection to permit the pivot bump 156 to clear the flex retainer 190. The flex retainer 190 yields to the pivot bump 156 when the applied rotational force exceeds the designated threshold. Accordingly, the flex retainer 190 and the mating shaft 140, including the pivot bump 156, may be configured so that the object hook 104 rotates independently with respect to the mating shaft 140 when an applied rotational force exceeds a designated amount. For example, a user may apply a rotational force to the object hook 104. While the rotational force is applied, the user handle 102 may be held in a fixed position by the user or may be held by other forces that resist movement. When the applied rotational force exceeds a designated or designed threshold the object hook 104 is permitted to rotate independently.

The object hook 104 is configured to rotate between a first pivot position and a second pivot position. In the first pivot position, the object hook 104 is configured to rotate with the user handle 102 such that the object hook 104 and the user handle 102 have essentially fixed positions with respect to one another. When the user handle 102 pivots or rotates, the object hook 104 also pivots or rotates. This rotation may be referred to as dependent rotation because movement of the object hook 104 is controlled by movement of the user handle 102. During dependent rotation, such as when the user handle 102 moves between the position shown in FIG. 1 and the position shown in FIG. 2, the threshold rotational force is not exceeded. For instance, the recess surface 191 holds the pivot bump 156 when an applied rotational force is less than a designated threshold. The recess surface 191 and the pivot bump 156 impede inadvertent rotation of the object hook 104. In some embodiments, the object hook 104 and the user handle 102 may have essentially fixed positions with respect to one another during dependent rotation.

In the second pivot position, the object hook 104 has rotated a designated number of degrees with respect to the first pivot position. For example, in the second pivot position, the object hook 104 has rotated about 90 degrees about the shaft axis 145 (FIG. 5) with respect to the first pivot position. The object hook 104 has the second pivot position in FIG. 3.

When the object hook 104 moves freely with respect to the user handle 102, the object hook 104 is rotating independently from the user handle 102. In order to rotate independently, the rotational force for moving the mating shaft 140 exceeds a threshold amount such that the pivot bump 156 clears the flex retainer 190. After clearing the flex retainer 190, the object hook 104 may rotate freely without requiring a significant amount of rotational force. In other words, the rotational force for moving the object hook 104 after the pivot bump 156 has cleared the flex retainer 190 is less than the rotational force required for clearing the flex retainer 190. In the illustrated embodiment, the object hook 104 does not experience a biasing force as the object hook 104 is rotated independently with respect to the user handle 102. In other embodiments, a spring or other biasing feature may resist rotation.

In some embodiments, the pivot-control mechanism provides a tactile indication as the object hook 104 and the user handle 102 transition between the dependent rotation and the independent rotation. More specifically, a user may sense that the flex retainer 190 has released (or engaged) the pivot bump 156 through a noticeable change in force applied by the user and/or vibrations in the object hook 104.

A more detailed description of the pivot-control mechanism for at least one embodiment follows. In the first pivot position, the pivotal boss 148 (FIG. 5) is disposed within the boss-receiving region 181. The pivot bump 156 is held by the recess surface 191. The pivot bump 156 may be characterized as being nested within a pocket defined by the recess surface 191. The axial stop surface 160 (FIG. 5) interfaces with the blocking surface 188, and the axial stop surface 170 (FIG. 5) interfaces with a blocking surface 195. In the first pivot position, the pivot-stop surface 162 (FIG. 5) interfaces with the first wall surface 186, and the pivot-stop surface 174 (FIG. 6) interfaces with a third wall surface 196.

After the pivot bump 156 clears the longitudinal edge 193, the object hook 104 may pivot with less resistance to the second pivot position. As the object hook 104 pivots to the second pivot position, the axial stop surface 160 slides along the blocking surface 188, and the axial stop surface 170 slides along the blocking surface 195. In the second pivot position, the pivot-stop surface 164 interfaces with the second wall surface 187. In the illustrated embodiment, the object hook 104 does not experience a biasing force (e.g., a force for returning the object hook 104 to the first pivot position) as the object hook 104 is rotated to the second pivot position. In other embodiments, however, a spring or other biasing feature may resist rotation as the object hook 104 is rotated to the second pivot position.

To move the object hook 104 from the second pivot position to the first pivot position, the object hook 104 may initially pivot with little resistance toward the first pivot position. The axial stop surface 160 slides along the blocking surface 188, and the axial stop surface 170 slides along the blocking surface 195. As the object hook 104 rotates, the pivot bump 156 approaches and engages the flex retainer 190. To complete the movement to the first pivot position, a rotational force must exceed a threshold for the pivot bump 156 to clear the longitudinal edge 193. After the pivot bump 156 clears the longitudinal edge 193, the pivot bump 156 is disposed alongside the recess surface 191 and the object hook 104 has returned to the first pivot position.

The pivot-control mechanism may allow the object hook and the user handle to rotate at most a designated amount. For example, the first wall surface 186, the second wall surface 187, the first pivot-stop surface 162, and the second pivot-stop surface 164 may be configured (e.g., positioned, sized, and shaped) to permit the object hook to rotate at most 150 degrees between the first and second pivot positions. In certain embodiments, the first wall surface 186, the second wall surface 187, the first pivot-stop surface 162, and the second pivot-stop surface 164 may be configured to permit the object hook to rotate at most 120 degrees between the first and second pivot positions. Yet in more particular embodiments, the first wall surface 186, the second wall surface 187, the first pivot-stop surface 162, and the second pivot-stop surface 164 may be configured to permit the object hook to rotate at most 100 degrees between the first and second pivot positions or, more particularly, at most 90 degrees between the first and second pivot positions.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

What is claimed is:

1. An assist grip assembly comprising:
a user handle; and
an object hook pivotally coupled to the user handle; and
a pivot-control mechanism enabling dependent rotation, in which the object hook and the user handle move together, and permitting independent rotation, in which the object hook and the user handle move freely with respect to one another, wherein the pivot-control mechanism includes a mating shaft that extends from the user handle and includes a first pivot-stop surface and a second pivot-stop surface, and a receiving cavity that is formed in the object hook having a flex retainer disposed therein and including a first wall surface and a second wall surface, the flex retainer engaging the mating shaft during the dependent rotation, the flex retainer releasing the mating shaft to permit the independent rotation,
wherein the pivot-control mechanism permits the mating shaft to rotate between a first pivot position and a second pivot position, the first wall surface engaging the first pivot-stop surface in the first pivot position, the second wall surface engaging the second pivot-stop surface in the second position.

2. The assist grip assembly of claim 1, wherein the pivot-control mechanism includes a pivot bump that extends from the mating shaft and a recess surface formed in the flex retainer that engages the pivot bump during dependent rotation, the pivot bump and the recess surface clearing each other when a rotational force applied to the object hook exceeds a designated threshold to permit the independent rotation.

3. The assist grip assembly of claim 1, wherein the flex retainer is configured to release the mating shaft while the user handle is positioned against a surface to define a closed position.

4. The assist grip assembly of claim 1, wherein the mating shaft is integrally formed with the user handle.

5. The assist grip assembly of claim 1, wherein the object hook has an exterior surface that slidably engages the user handle, the receiving cavity opening toward the exterior surface.

6. The assist grip assembly of claim 1, wherein the pivot-control mechanism includes a pivotal boss formed on the mating shaft and a boss-engaging surface formed in the receiving cavity, the pivotal boss and the boss-engaging surface forming a snap-fit when the mating shaft is inserted into the receiving cavity.

7. The assist grip assembly of claim 1, wherein the pivot-control mechanism provides a tactile indication as the object hook and the user handle transition between the dependent rotation and the independent rotation.

8. An assist grip assembly comprising:
a user handle; and
an object hook; and
a pivot-control mechanism that pivotally couples the user handle and the object hook, the pivot-control mechanism comprising:
a mating shaft extending from the user handle and configured to rotate about a shaft axis, the mating shaft including a first pivot-stop surface and a second pivot-stop surface;
a receiving cavity formed in the object hook and configured to receive the mating shaft, the receiving cavity being partially defined by a first wall surface and a second wall surface, wherein the object hook is configured to rotate between a first pivot position and a second pivot position, the first wall surface engaging the first pivot-stop surface in the first pivot position, the second wall surface engaging the second pivot-stop surface in the second pivot position; and
a pivot bump extending from the mating shaft and a recess surface formed in the receiving cavity that engage each, the recess surface holding the pivot bump when an applied rotational force applied to the object hook is less than a designated threshold, the pivot bump and the recess surface clearing each other when the applied rotational force exceeds the designated threshold, the object hook permitted to rotate independently with respect to the user handle after the pivot bump and the recess surface clear each other.

9. The assist grip assembly of claim 8, wherein a flex retainer is positioned within the receiving cavity and includes the recess surface, the flex retainer yielding to the pivot bump when the applied rotational force exceeds the designated threshold.

10. The assist grip assembly of claim 8, wherein the pivot bump and the recess surface are elongated and extend longitudinally parallel to the shaft axis.

11. The assist grip assembly of claim 8, wherein the mating shaft includes the pivot bump.

12. The assist grip assembly of claim 8, wherein the user handle includes the mating shaft and also has a grip section and a handle leg extending from the grip section, the mating shaft being integrally formed with the handle leg.

13. The assist grip assembly of claim 8, wherein the pivot-control mechanism includes a pivotal boss formed on the mating shaft and a boss-engaging surface formed in the receiving cavity, the pivotal boss and the boss-engaging surface forming a snap-fit when the mating shaft is inserted into the receiving cavity.

14. The assist grip assembly of claim 8, wherein the first wall surface, the second wall surface, the first pivot-stop surface, and the second pivot-stop surface are configured to permit the object hook to rotate at most 120 degrees between the first and second pivot positions.

15. The assist grip assembly of claim 8, wherein the object hook does not experience a resisting force when the object hook is permitted to rotate independently with respect to the user handle.

16. An assist grip assembly comprising:
a user handle having a grip section and a handle leg extending from the grip section, the user handle also including a mating shaft, the mating shaft including a first pivot-stop surface and a second pivot-stop surface and having a pivot boss at a distal end of the mating shaft, wherein the mating shaft is integrally formed with the handle leg; and
an object hook having a receiving cavity, the receiving cavity being partially defined by a first wall surface and a second wall surface, the receiving cavity also being partially defined by a boss-engaging surface that is sized and shaped to form a snap-fit with the pivot boss of the mating shaft when the mating shaft is inserted into the receiving cavity;
wherein the mating shaft and the receiving cavity form a pivot-control mechanism that permits the mating shaft to rotate between a first pivot position and a second pivot position, the first wall surface engaging the first pivot-stop surface in the first pivot position, the second wall surface engaging the second pivot-stop surface in the second pivot position.

17. The assist grip assembly of claim 16, wherein the pivot-control mechanism enables dependent rotation, in which the object hook and the user handle move together, and permits independent rotation, in which the object hook and the user handle move freely with respect to one another, wherein the receiving cavity has a flex retainer disposed therein, the flex retainer engaging the mating shaft during the dependent rotation, the flex retainer releasing the mating shaft to permit the independent rotation.

18. The assist grip assembly of claim 16, wherein the pivot-control mechanism includes a pivot bump that extends from the mating shaft and a recess surface formed in the receiving cavity that engages the pivot bump during dependent rotation, the pivot bump and the recess surface clearing each other when a rotational force applied to the object hook exceeds a designated threshold to permit the independent rotation.

19. The assist grip assembly of claim 16, wherein the first wall surface, the second wall surface, the first pivot-stop surface, and the second pivot-stop surface are configured to permit the object hook to rotate at most 120 degrees between the first and second pivot positions.

20. The assist grip assembly of claim 16, wherein the object hook has an exterior surface that slidably engages the user handle, the receiving cavity opening toward the exterior surface.

* * * * *